United States Patent
Bentley et al.

(10) Patent No.: US 9,053,624 B2
(45) Date of Patent: Jun. 9, 2015

(54) SYSTEM AND METHOD FOR TRACKING IN MULTI-STORY BUILDINGS

(75) Inventors: Jon L. Bentley, New Providence, NJ (US); Anjur S. Krishnakumar, Princeton, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 550 days.

(21) Appl. No.: 13/351,451

(22) Filed: Jan. 17, 2012

(65) Prior Publication Data

US 2013/0181834 A1  Jul. 18, 2013

(51) Int. Cl.

| | | |
|---|---|---|
| *G08B 1/08* | (2006.01) | |
| *G08B 13/24* | (2006.01) | |
| *G08B 21/02* | (2006.01) | |
| *H04W 4/04* | (2009.01) | |
| *G08B 21/00* | (2006.01) | |
| *G08B 13/14* | (2006.01) | |
| *H04W 4/00* | (2009.01) | |
| *H04W 24/00* | (2009.01) | |
| *G01S 3/02* | (2006.01) | |

(52) U.S. Cl.
CPC ........ *G08B 13/2462* (2013.01); *G08B 21/0252* (2013.01); *H04W 4/043* (2013.01)

(58) Field of Classification Search
USPC ............... 340/539.13, 665, 572.8; 455/435.2; 342/451
See application file for complete search history.

(56) References Cited

U.S. PATENT DOCUMENTS

| | | | |
|---|---|---|---|
| 7,272,394 B2 | 9/2007 | Krishnakumar et al. | |
| 2003/0151524 A1* | 8/2003 | Clark | 340/870.07 |
| 2004/0185822 A1* | 9/2004 | Tealdi et al. | 455/404.1 |
| 2004/0212500 A1* | 10/2004 | Stilp | 340/541 |
| 2004/0246926 A1* | 12/2004 | Belcea et al. | 370/332 |
| 2006/0250234 A1* | 11/2006 | Maschke | 340/539.13 |
| 2008/0077326 A1* | 3/2008 | Funk et al. | 701/220 |
| 2009/0033500 A1* | 2/2009 | Malik et al. | 340/572.8 |
| 2012/0015665 A1* | 1/2012 | Farley et al. | 455/456.1 |

OTHER PUBLICATIONS

Baker, "With New Fire Department Technology, a 'Mayday' Could Bring Faster Help," http://www.nytimes.com/2011/07/13/nyregion/new-fdny-software-would-allow-faster-may . . . , retrieved Sep. 27, 2011, The New York Times, published Jul. 12, 2011, 3 pages.

(Continued)

*Primary Examiner* — Jack K Wang
(74) *Attorney, Agent, or Firm* — Maldjian Law Group LLC; John Maldjian; Alexander D. Walter (57) ABSTRACT

System and method to locate a person in a multi-level building, including: a portable transmitter coupled to the person, the portable transmitter configured to transmit a signal comprising an identification code; a plurality of receivers located in a multi-level building to receive the signal, substantially each receiver producing a received signal, wherein at least a first receiver is located on a first level and at least a second receiver is located on a second level, wherein the second level is different than the first level; a signal strength estimator coupled to at least one receiver, the signal strength estimator configured to produce a signal strength estimation of the received signal received by the at least one receiver; and a processor configured to receive the signal strength estimations, and from the signal strength estimations calculate a level of the multi-level building on which the person is located.

19 Claims, 4 Drawing Sheets

(56) References Cited

OTHER PUBLICATIONS

Tarantola, "Breadcrumb Routers Are A Firefighter's New Best Friend," http://gizmodo.com/5815439/breadcrumb-routers-are-a-firefighters-new-best-friend, retrieved Nov. 1, 2011, Gizmodo, published Jun. 6, 2011, 6 pages.

Bray, "When rescuers need rescuing," http://www.boston.com/business/technology/articles/2010/08/30/high_tech_firefighter_res . . . , retrieved Nov. 1, 2011, The Boston Globe, published Aug. 30, 2010, 4 pages.

PASS device, http://en.wikipedia.org/wiki/PASS_device, retrieved Sep. 27, 2011, Wikipedia, 1 page.

\* cited by examiner

SYSTEM AND METHOD FOR TRACKING IN MULTI-STORY BUILDINGS

BACKGROUND

1. Field of the Invention

Embodiments of the present invention generally relate to tracking suitably-equipped mobile objects such as a person, an animal, or a mobile apparatus, in a building. More specifically, embodiments of the present invention relate to a system and method for tracking the location of emergency responders in a multi-story building, and reporting the locations to one or more monitoring stations, by use of a transponder.

2. Description of the Related Art

Knowing the physical locations of one or more persons, such as the locations of emergency responders who are responding to an emergency, is often of keen interest. For instance, firefighters fighting a fire, or a monitoring station such as a command site responsible for directing the firefighters, may need to know the location of each firefighter in real time, in order to direct firefighter resources for fire suppression, rescue of a victim, rescue of the first responder, rescue of fellow first responders, danger avoidance, and so forth. Time may be of the essence in such situations. The problem of locating each firefighter is made difficult by the environment, including poor visibility from the presence of smoke and lack of lighting or the failure of lighting, heat or the fire itself, debris and/or collapsing structure caused by the fire, noxious fumes emitted by burning materials, lack of oxygen, and so forth. This problem may be exacerbated in multilevel structures such as office buildings, large apartment buildings, etc., in which the firefighters may be spread across multiple floors, or in which certain floors such as subbasements or upper levels of tall buildings may have limited transmission range.

The problem of locating and/or tracking first responders in real time may also be applicable to police and/or SWAT responders, who may be called upon to hunt for a criminal in a large building, although such an environment may not be as hostile as a firefighting environment.

Various schemes have been contemplated to address the problem of locating firefighters. Some fire departments have been working to develop an accountability system that would more effectively pinpoint, track, and record the locations of firefighters and equipment. Having a record of the positions of firefighters while fighting a fire may also be useful during post-event training in order to illustrate examples of tactics or strategies that were either effective or not effective. The goal of tracking mayday calls more precisely is one of several initiatives that some fire departments have undertaken as part of an overall strategy that relies on data to increase awareness and communication in emergencies, when hundreds of people may be converging at once, such as in a large urban office building.

Mayday radio systems and associated software are available that broadcast which first responders may be in need of help. However, such systems and software do not address the problem of determining the location of a first responder with enough precision to direct the movement of the first responder or the co-responders to a safe position or a position where they may be needed, particularly in large, multi-story buildings in which the location problem becomes three-dimensional. For example, it would be useful to know the location of a trapped firefighter on a three-dimensional diagram with a relatively exact location of where he or she is trapped.

Other systems known in the art include disposable elements that together create a mesh-like communication system. The disposable elements create an electronic "breadcrumb" through which it may be possible to determine the location of a particular emergency responder. A disadvantage of such systems is that many response situations do not turn out to be emergency situations, and in those cases the disposable elements are wasted and may present a nuisance for a property owner to clean up. Another disadvantage is that the disposable elements are not always reliable and should one or more fail, it compromises the effectiveness of the overall mesh system.

Yet another approach to tracking known in the art is to have a first responder wear a tracking device such as in a boot. The tracking device will keep track of motion in three dimensions and radio back a position that is calculated by dead reckoning principles. The tracking device may also include additional sensors such as a barometer that may indicate altitude. A disadvantage of such systems is that positional errors of inertial navigation systems increase over time, and barometric readings may become inaccurate if air pressure changes inside a building due to a fire becoming sufficiently large.

Yet another approach to tracking known in the art is to use triangulation or electromagnetic field strength properties of the radio waves. However, radio waves inside a building may experience multiple reflections, making such a triangulation or field strength approach difficult to implement.

Yet another approach to tracking known in the art is to use a motion detector to detect a lack of motion. Once a lack of motion is detected, an audible signal is emitted. Disadvantages of this approach include hearing the audible signal sufficiently well in a noisy environment, dependence upon direction-finding by the human ear, blockage of audible signals such as between floors, acoustic reflections, and so forth.

The known art may be adequate for small structures, but is inadequate for the large, multi-story structures that typically house large companies. The structures often include a robust communication structure such as Ethernet access and/or WiFi or other wireless access technologies. Therefore, there is a need for an improved position locating method and system in order to overcome the shortcomings of the known art for large, multi-story structures.

SUMMARY

Embodiments in accordance with the present invention may include a portable transponder, a system and a method to locate a mobile object, such as a living being or a robotic apparatus, in a multi-level building. The living being may be a person, a search and rescue dog, and so forth. As used herein, the living being and the robotic apparatus may be referred to as a human or person unless the context clearly excludes non-human animals or excludes a robotic apparatus.

The system and method may include: a portable transponder detachably coupled to the person, the portable transponder configured to transmit a signal comprising an identification code; a plurality of receivers located in a multi-level building to receive the signal, substantially each receiver producing a received signal, wherein at least a first receiver is located on a first level and at least a second receiver is located on a second level, wherein the second level is different than the first level; a signal strength estimator coupled to at least one receiver, the signal strength estimator configured to produce a signal strength estimation of the received signal received by the at least one receiver; and a processor configured to receive the signal strength estimations, and from the signal strength estimations calculate a level of the multi-level building on which the person is located, and a position within the calculated level.

In an embodiment, the system may further include a memory coupled to the processor, the memory configured to store instructions such that, when the instructions are performed by the processor, the processor performs the steps of: ranking the received signals received at various strengths in the order of strength; considering the m strongest received signals to be a first subset, where m is a positive integer; when a majority of the m strongest received signals of the first subset are associated with a same zone, considering that same zone to be a candidate zone; adding a value k to the strongest received signal not in the first subset, which may or may not change the ranking of the received signals received at various strengths in the order of strength; considering the m strongest received signals to be a second subset; and when a majority of the m strongest received signals of the second subset are associated with a same zone, determining whether that same zone matches the candidate zone, and if so, determining the portable transponder to be located in the candidate zone.

BRIEF DESCRIPTION OF THE DRAWINGS

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments encompassed within the scope of the present invention, and, therefore, are not to be considered limiting, for the present invention may admit to other equally effective embodiments, wherein.

The headings used herein are for organizational purposes only and are not meant to be used to limit the scope of the description or the claims. As used throughout this application, the word may is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines.

DETAILED DESCRIPTION

Embodiments of the present invention generally relate to tracking persons in a building. More specifically, embodiments of the present invention relate to a transponder, a system and a method for tracking the location of emergency responders in a multi-story building, and reporting the locations to one or more monitoring stations.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

U.S. Pat. No. 7,272,394 to Krishnakumar et al. ("Krishnakumar," or "the '394 Patent,"), titled "Location estimation of wireless terminals in a multi-story environment," is hereby incorporated by reference in its entirety. Krishnakumar discloses a method and apparatus for estimating the location of a wireless terminal across multiple building floors. Krishnakumar determines the floor where the wireless terminal is presently located by using a majority logic-based heuristic. A plurality of signal monitors measure signals from the wireless terminal and provide those signal strength measurements to a location estimation server.

Alternatively, according to embodiments disclosed in the '394 Patent, the wireless terminal may measure signals that are transmitted by a plurality of transmitting signal devices, and provides those signal strength measurements to a location estimation server. A person of skill in the art would know that in such an embodiment the wireless terminal will identify or otherwise distinguish substantially either each transmitting signal device, or a spatially proximate group of devices (e.g., 10th floor devices). For example, a transmitting signal device may transmit signals having identifiable features that are unique among the transmitting signal device that are within range of reception by the wireless terminal. For instance, transmitting signal device may transmit on unique frequencies, or transmit using unique TDM time slots, PN sequences, identification number, etc. An identification number may identify the wireless terminal and/or the person assigned to the wireless terminal, which can then be mapped to a database entry that contains further information such as a name, a rank, a unit, an age, a medical condition, etc. The signal strength measurements gathered by the wireless terminal are then provided to the location estimation server by use of a transmission channel from the wireless terminal. The location estimation server determines the floor of the wireless terminal in accordance with the illustrative embodiment of Krishnakumar.

Embodiments in accordance with the present invention may use existing wireless enterprise communication systems to track firefighters and other emergency workers as they travel through buildings. Embodiments described herein may be described only with respect to firefighting scenarios, but such embodiments may be usable in other scenarios such as police emergencies, SWAT, hazardous material containment, medical emergency, tracking search and rescue dogs, etc., unless clearly and explicitly disclaimed otherwise.

An embodiment of the present invention may include a wireless transponder carried by a firefighter, the transponder being configured as a transmitter to transmit a wireless signal as disclosed in the '394 patent. A small and/or lightweight transmitter should be easily coupled to the firefighter, his clothing or his gear without being unduly cumbersome. The transmitter transmits a wireless signal that includes a code that uniquely identifies the firefighter. Tracking technology disclosed in the '394 Patent may then be used to track the position of each transmitter.

In another embodiment in accordance with the present invention, a transponder configured to be a wireless receiver is carried by a firefighter, the receiver being configured to receive a wireless signal as disclosed in the '394 patent. A small and/or lightweight receiver should be easily coupled to the firefighter. Tracking technology disclosed in the '394 patent may then be used to track the position of the receiver relative to a sufficient number of transmitters to determine the location of the transponder.

Embodiments in accordance with the present invention support access to a wireless communication system installed in a multi-story building, wherein the wireless communication system includes switchable operating modes. In a normal operating mode, the wireless communication system processes routine (i.e., non-emergency) communications by methods known in the art, for instance the IEEE 802.11 wireless protocol (i.e., WiFi), IEEE 802.15.4 (i.e., ZigBee), Bluetooth®, and so forth. A second operating mode is an emergency tracking mode. Embodiments in accordance with the present invention may include an access port that allows authorized third parties such as a fire department command center to gain access to the system, switch the system to the emergency tracking mode, and control the system. The access port may be, for instance, a physical port configured to accept a networking cable or the like, or could be an administrative login that is accessible remotely, either by wireless methods or by a local area network ("LAN") or wide area network ("WAN") (e.g., internet or intranet) communicatively coupled to the communication system. When the access port is activated for the emergency tracking mode, usage of the communication system may be disabled for routine communications, thus allowing for substantially all of the resources of the system to be devoted to tracking the firefighters within the building and handling of related emergency calls. In emergency tracking mode, the communication system may process signals that are adapted to operate in accordance with the '394 Patent. For example, transmit power variations may be restricted, identification fields may be added to transmitted signals or to signals to be received, and a communication interface may be established to a location processor or server. The system may be switched back to the normal operating mode, via the access port, upon conclusion of emergency usage of the system.

The access port should be configured to have sufficient security procedures and/or security modules to substantially deter or deny unauthorized access. Security procedures may include physical security of a physical port, encrypted communication, and usage of passwords.

A multi-story building may have multiple tenants on different floors with separate wireless systems, or multiple tenants on the same floor with separate wireless systems. If the wireless systems are in accordance with the '394 Patent, then embodiments in accordance with the present invention may operate independently within each tenant's physical space. A tracking system receiving from the transponder may include an identity of the tenant in a report, thereby narrowing the location of the transponder to be within a space occupied by the reported tenant, or within radio reception range of the tenant. Alternatively, at least some of the separate wireless systems may be configured in advance to operate as a single tracking system in case of an emergency.

Embodiments in accordance with the present invention may further operate in cooperation with predefined maps of the interior layout of one or more floors of the building, and the maps are made available to a command center. Such maps may be created in advance, and may be accessed by the command center in order to direct the movement of firefighters by the command center. Such maps may be created or updated, for instance, when there is significant construction or renovation activity in the building. Maps may be stored in the location server, or may be stored off-site at a location accessible by the command center.

Embodiments in accordance with the present invention may further comprise an emergency signal activator (e.g., a "Mayday button"). Pressing the emergency signal activator may be used to indicate that a firefighter is in danger, causing an emergency signal to be produced. For example, the emergency signal may be an emergency code that is transmitted from the wireless transmitter carried by a firefighter to the fire department command center. The emergency code may include identification, information about status, and so forth.

In further embodiments in accordance with the present invention, the emergency signal activator may comprise a motion detector, an accelerometer, etc., configured to emit an audible distress signal. For instance, the emergency signal activator may cause the wireless transmitter carried by the firefighter to emit a loud audio signal if the motion detector has not been moved for a specified period of time, typically 15-30 seconds. This procedure may alert fellow firefighters that the wearer of the device may be unresponsive or otherwise disabled.

In further embodiments in accordance with the present invention, the emergency signal activator may include an acoustic processing module to detect an audible distress signal from a nearby wireless transmitter, and then transmit an appropriate code.

An emergency signal activator may also include a voice recognition module configured to scan for a firefighter saying the word "Mayday" or other distress code, and then activate the device.

Substantially each wireless transmitting device could transmit using a wireless protocol such as the IEEE 802.11 wireless protocol (i.e., WiFi), IEEE 802.15.4 (i.e., ZigBee), Bluetooth®, and so forth. Bluetooth is known in the art as is a proprietary open wireless technology standard for exchanging data over short distances (using short wavelength radio transmissions in the ISM band from 2400-2480 MHz) from fixed and mobile devices, creating personal area networks (PANs) with high levels of security. Radio transmissions may rely upon a single frequency, or a device could transmit on multiple frequencies, and thereby be compatible with wireless networks in a variety of different buildings.

Figure 1:
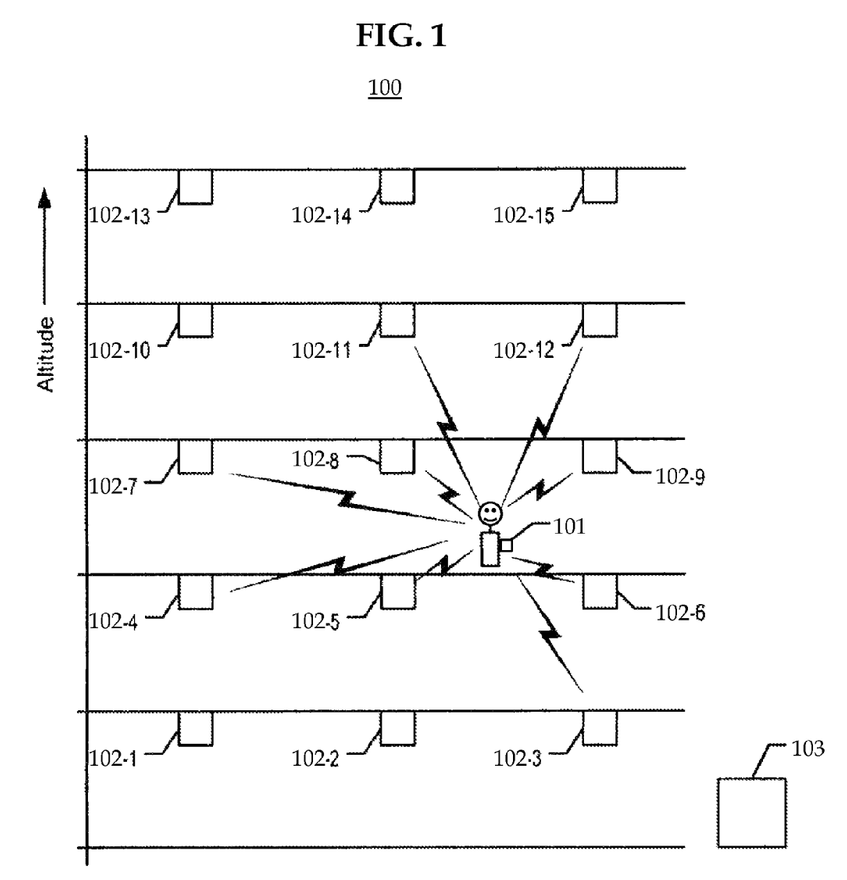
FIG. 1 illustrates a cross sectional view of a multi-floor building with a communication infrastructure, in accordance with an embodiment of the present invention.

FIG. 1 depicts an example of an illustrative embodiment of the present invention. In wireless network 100, signal devices 102-1 through 102-15 are distributed across a multi-story office building. An individual, but not necessarily specific signal device 102-1 through 102-15, may be referred herein as 102-n or 102-i. In the example, signal devices 102-1 through 102-3 are on the lowest floor depicted, while signal devices 102-13 through 102-15 are on the highest floor depicted.

Signal devices 102-1 through 102-15 in the example are signal monitors that are capable of receiving signals and making signal measurements.

It will be clear to those skilled in the art, after reading this specification, how to make and use embodiments of the present invention with a different number of signal devices on a different number of floors and with multiple wireless terminals present.

In this embodiment, each floor is considered to be a "zone" within a larger space (i.e., the building). It will be clear, however, to those skilled in the art, after reading this specification, how to make and use embodiments of the present invention that applies the concept of zones to signify something other than the floors of a building. For example, zones may include but not be limited to, pods, sections of floors, a section of a floor occupied by a single tenant, multiple floors, individual rooms, stairwells, elevator car or elevator shaft, and so forth.

A person within a multi-story office building carries with him a wireless terminal 101. Wireless terminal 101 may also be referred to herein as a transponder 101. Wireless terminal 101 may be coupled to the clothing of the person (e.g., fire coat, boot heel, etc.) or gear of the person (e.g., helmet, emergency band radio, etc.), or may be coupled to the person himself by being wearable (e.g., wrist band, pendant, etc.). Wireless terminal 101 transmits a signal as packets of data in a well-known fashion. One or more of signal devices 102-1 through 102-15 detect the signal corresponding to the packets of data transmitted by wireless terminal 101. In the example depicted in FIG. 1, signal devices 102-3, 102-4, 102-5, 102-6, 102-7, 102-8, 102-9, 102-11, and 102-12 are receiving and measuring the signal transmitted by wireless terminal 101. Note that the signal paths of the signal that is transmitted by wireless terminal 101 traverse a plurality of zones (i.e., floors).

In a building having a communication infrastructure as illustrated in FIG. 1, there may be more than one person, each carrying their own wireless terminal 101. The signal transmitted by wireless terminal 101 may include a substantially unique identification ("ID") of wireless terminal 101 and/or the person that is carrying wireless terminal 101. The ID should be unique at least among the group of wireless terminals 101 that are expected to be in the building.

In some other embodiments of the present invention, signal devices 102-1 through 102-15 transmit signals. Wireless terminal 101 makes signal measurements on the received signals and transmits the signal measurements, in well-known fashion, to location estimation server 103 (e.g., through an intermediary access point, etc.). In these embodiments, each of signal devices 102-1 through 102-15 transmits a uniquely identifiable signal so that wireless terminal can determine the source of the measured signals. The signals from signal devices 102-1 through 102-15 may be identifiable by methods that include use of an ID field, a frequency, a time slot of transmission, and so forth.

Location estimation server 103 acquires the signal strength measurements made by one or more of signal devices 102-1 through 102-15 in accordance with the illustrative embodiment of the present invention. For example, location estimation server 103 may be communicatively coupled to at least a portion of signal devices 102-1 through 102-15 by a wired connection (e.g., Ethernet, RS-232, RS-485, USB, twisted shielded pair, etc.), or to some signal devices 102-n by a wireless connection (e.g., WiFi, Bluetooth®, etc.) if the RF propagation loss is sufficiently low such as may be the case for signal devices 102-n physically located on the same floor as the location estimation server 103.

Location estimation server 103 will estimate the location of wireless terminal 101 by use of methods described below in further detail. Locations of multiple wireless terminals 101 may be calculated and reported independently by use of the ID signal transmitted by each wireless terminal 101.

Optionally, location estimation server 103 and/or signal devices 102-1 through 102-15 may be able to operate from a secondary power source such as a battery backup power if fire or other emergency (e.g., flooding, building collapse, trauma such as a car hitting the building, widespread blackout/brownout, equipment failure, vandalism or other intentional action) disrupts the main power source.

Figure 2:
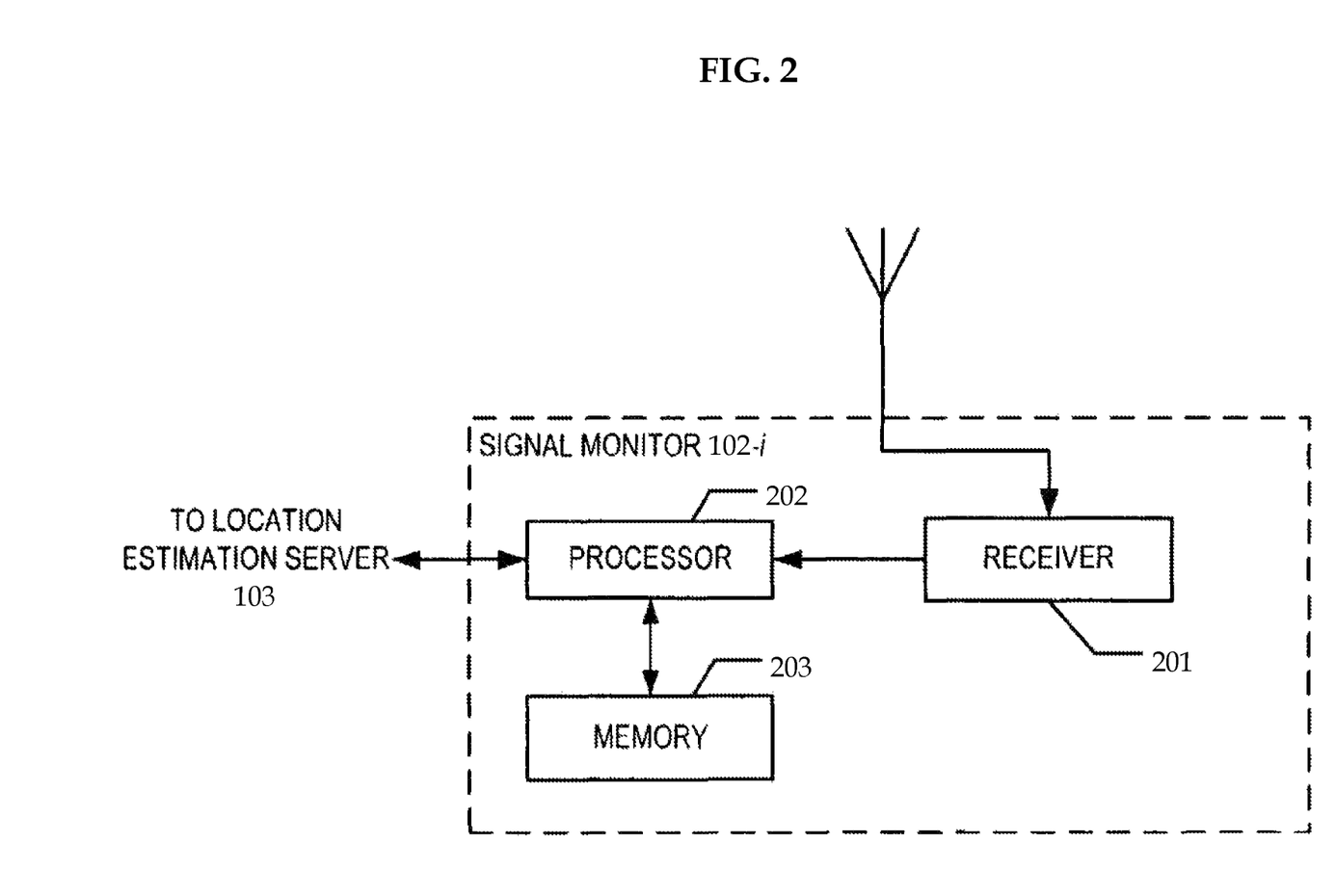
FIG. 2 illustrates a schematic view of a signal monitor in accordance with an embodiment of the present invention.

FIG. 2 depicts a block diagram of the salient components of signal monitor 102-n in accordance with the illustrative embodiment of the present invention. Signal monitor 102-n comprises receiver 201, processor 202, memory 203 and antenna 204, interconnected as shown.

Receiver 201 is a circuit that is capable of receiving packets from the wireless medium, in well-known fashion, and of forwarding them to processor 202. It will be clear to those skilled in the art how to make and use receiver 201.

Processor 202 is a general-purpose processor that is capable of performing the tasks described below and with respect to FIG. 4. It will be clear to those skilled in the art, after reading this specification, how to make and use processor 202.

Memory 203 is capable of storing programs and data used by processor 202. It will be clear to those skilled in the art how to make and use memory 203.

Figure 3:
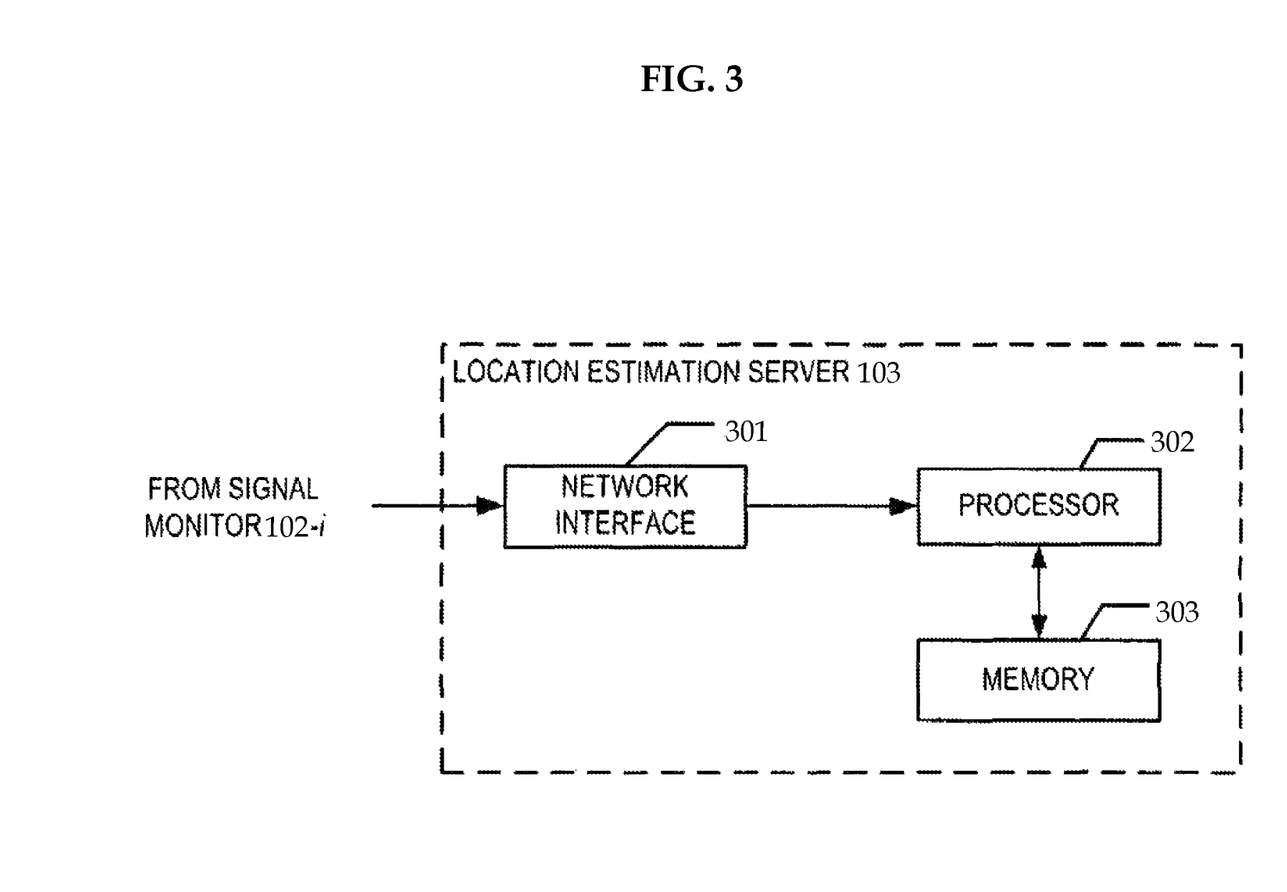
FIG. 3 illustrates a schematic view of a location estimation server in accordance with an embodiment of the present invention.

FIG. 3 depicts a block diagram of the salient components of location estimation server 103 in accordance with the illustrative embodiment of the present invention. Location estimation server 103 comprises network interface 301, processor 302, and memory 303, interconnected as shown.

Network interface 301 is a circuit that is capable of receiving, in well-known fashion, signals from signal monitors 102-1 through 102-15. From the received signals, received signal strength measurements are made. In some embodiments, network interface 301 receives information from signal monitors 102-1 through 102-15 with which the location of the signal monitor can be determined. Network interface 301 is also capable of forwarding the information received to processor 302. It will be clear to those skilled in the art, after reading this specification, how to make and use network interface 301.

In some other embodiments, network interface 301 receives signal strength measurements made by a wireless terminal, through an intermediate device such as an access point. In this case, the signal strength measurements are representative of signals that are transmitted by the transmitting signal devices distributed across the network.

Processor 302 may be a general-purpose processor that is capable of performing the tasks described below and with respect to FIG. 4. It will be clear to those skilled in the art, after reading this specification, how to make and use processor 302.

Memory 303 is capable of storing programs and data used by processor 302. It will be clear to those skilled in the art how to make and use memory 303.

Figure 4:
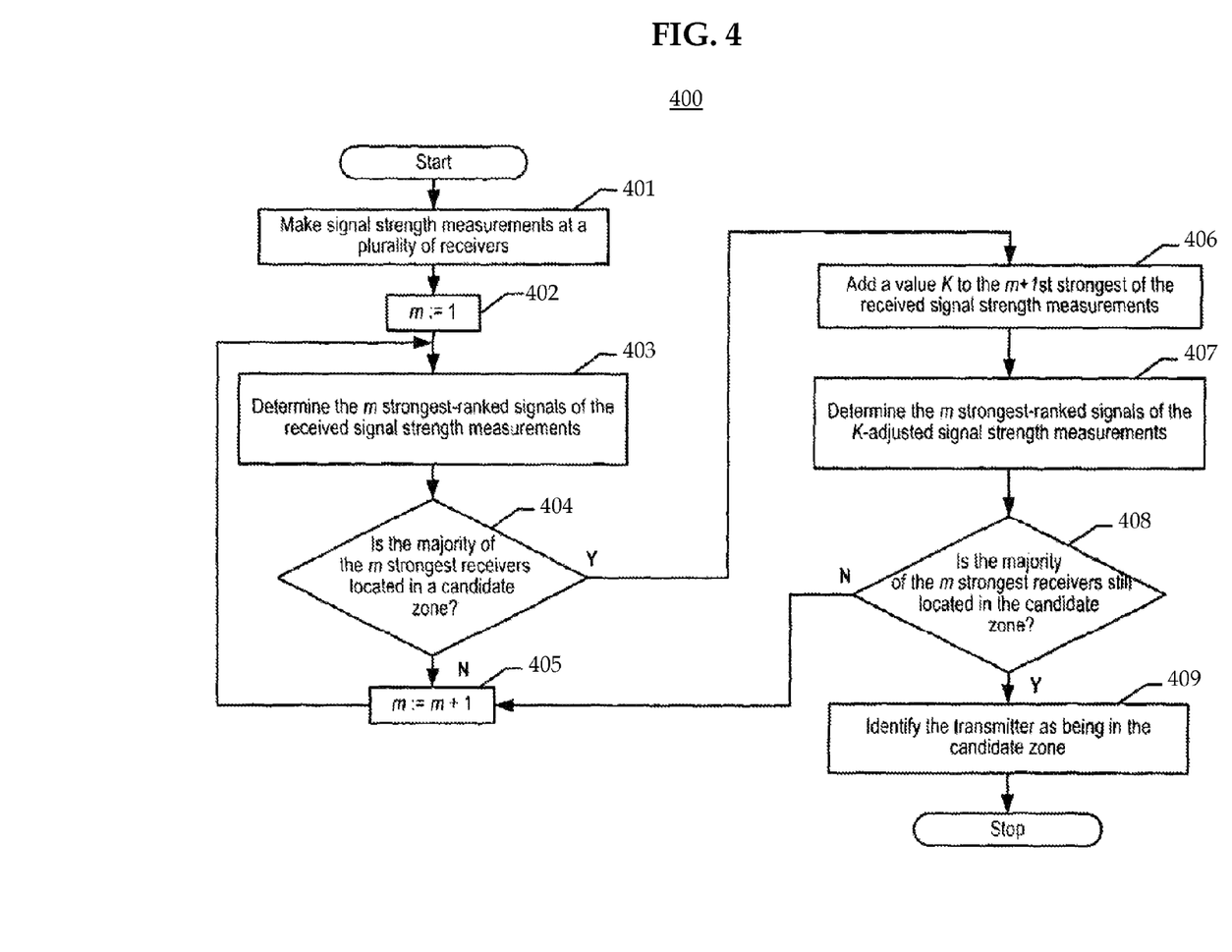
FIG. 4 illustrates a flowchart of a method in accordance with an embodiment of the present invention.

FIG. 4 depicts a flowchart of an emergency tracking mode 400 to perform the salient tasks performed by the illustrative embodiment, using the embodiment of a system depicted in FIG. 1. It will be clear to those skilled in the art which tasks depicted in FIG. 4 can be performed simultaneously or in a different order than that depicted.

At task 401, substantially each of signal devices 102-1 through 102-15 makes a signal strength measurement of a signal transmitted by wireless terminal 101. Signal devices 102-n that are closer to wireless terminal 101 ordinarily will receive a stronger signal, although signal strength may be affected by transmission conditions such as obstructions and reflections. Location estimation server 103 acquires the signal strength measurements obtained by some or all of signal devices 102-1 through 102-15. When the communication system is operating in emergency tracking mode 400, wireless terminal 101 will transmit at a substantially constant power level, without regard to adjusting transmit power levels based upon link conditions, so that positional calculations over time based upon signal strength over time measured at signal devices 102-1 through 102-15 are simplified.

Conversely, if wireless terminal 101 is operating as a receiver, then signal devices 102-1 through 102-15 transmit at substantially constant power levels, respectively, without regard to adjusting transmit power levels based upon link conditions, so that positional calculations over time based upon signal strength over time of signals from signal devices 102-1 through 102-15 are simplified.

At task 402, the quantity m is initialized to 1. The quantity m is significant in that the illustrative embodiment finds the minimum value for m such that a Majority Rule holds and a Stability Rule holds. These rules are described below in detail.

At task 403, location estimation server 103 determines the m strongest-ranked signals of the received signal strength measurements (as opposed to signal strength measurements adjusted by a value K that is described below).

At task 404, location estimation server 103 determines whether or not the majority of the receivers that correspond to the m strongest-ranked signals of the received signal strength measurements are located on a particular floor (i.e., a candidate zone) within the building. This is referred to in the illustrative embodiment as the "Majority Rule." If so, control proceeds to task 406. If not, control proceeds to task 405.

At task 405, the quantity m is incremented by one. Control then proceeds to task 403.

At task 406, location estimation server 103 adds a value K to the m+1st strongest of the received signal strength measurements. In some embodiments, the value K is between 4 dB and 6 dB, inclusive. In other embodiments, the value K is dependent on the value of m. It will be clear to those skilled in the art, after reading this specification, how to assign a value for K.

At task 407, location estimation server 103 determines the m strongest-ranked signals of the signal strength measurements that now include the measurement that has been adjusted by the value K. Note that the action performed at task 406 might have affected the makeup of the m strongest-ranked signals.

At task 408, location estimation server 103 determines whether or not the majority of the receivers that correspond to the m strongest signals that have been re-ranked at task 407 are still located on the same floor as before (i.e., the candidate zone) within the building. This is referred to in the illustrative embodiment as the "Stability Rule." If so, control proceeds to task 409. If not, control proceeds to task 405. [It seems to me that by both the Majority Rule and the Stability Rule, the algorithm will stop if just the top two strongest signals come from the same floor—is this the intended result? Also, how does this algorithm handle a situation in which there might be just one signal device 102-n per floor?]

At task 409, location estimation server 103 identifies wireless terminal 101 as being on the particular floor (i.e., the candidate zone) determined by applying the Majority Rule and Stability Rule.

The tasks depicted in FIG. 4 use a plurality of signal monitors and a location estimation server to determine the floor in which a wireless terminal is located. It will be clear, however, to those skilled in the art, after reading this specification, how to make and use embodiments of the present invention with other devices, such as access points to make measurements and a general-purpose server to apply the Majority Rule and Stability Rule to those measurements.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the present invention to the precise form disclosed. Modifications and variations are possible in light of the above teachings or may be acquired from practice of the present invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A portable transponder to locate a person in a multi-level building, comprising:
a first communication module configured to communicate with a plurality of WiFi transceivers located in a multi-level building after the plurality of WiFi transceivers have been switched from a normal operating mode of a WiFi network to an emergency tracking mode of the WiFi network based on a signal indicating an emergency, wherein at least a first WiFi transceiver is located on a first level and at least a second WiFi transceiver is located on a second level, wherein the second level is different than the first level; and
a processing module coupled to a memory, the processing module configured to process signal identifying the person communicated via the first communication module.

2. The portable transponder of claim 1, wherein the first communication module comprises a transmitter, and wherein the processing module is configured to process an identification of the portable transponder.

3. The portable transponder of claim 1, further comprising:
a second communication module configured to wirelessly communicate with a control module,
wherein the second communication module comprises a receiver configured to receive individually identifiable signals transmitted by the WiFi transceivers,
wherein each received individually identifiable signal includes an identification of the WiFi transceiver,
wherein the portable transponder transmits an identification of the received individually identifiable signals and a characteristic of the received individually identifiable signals via the second communication module.

4. The portable transponder of claim 1, wherein the portable transponder is coupled to a person.

5. The portable transponder of claim 1, wherein the portable transponder comprises an emergency signal activator.

6. The portable transponder of claim 5, wherein the emergency signal activator comprises a voice recognition module.

7. The portable transponder of claim 5, wherein the emergency signal activator comprises an acoustic processing module to detect an audible emergency signal from another portable transponder.

8. A system to locate a person in a multi-level building, comprising:
a portable transmitter coupled to the person, the portable transmitter configured to transmit a signal comprising an identification code for identifying the person;
a WiFi network comprising a plurality of WiFi receivers located in a multi-level building to receive the signal, substantially each WiFi receiver producing a received signal, wherein at least a first WiFi receiver is located on a first level and at least a second WiFi receiver is located on a second level, wherein the second level is different than the first level;

an access port configured to switch the WiFi network between a normal operating mode of the WiFi network and an emergency operating mode of the WiFi network, based on a signal indicating an emergency;

a signal strength estimator coupled to at least one WiFi receiver, the signal strength estimator configured to produce a signal strength estimation of the received signal received by the at least one WiFi receiver; and a processor configured to receive the signal strength estimations and identification code, and calculate a level of the multi-level building on which the person is located based on the signal strength estimations and the identification code.

9. The system of claim 8, further comprising a memory coupled to the processor, the memory configured to store instructions such that, when the instructions are performed by the processor, the processor performs the steps of:

ranking the received signals received at various strengths in the order of strength;

considering the m strongest received signals to be a first subset, where m is a positive integer;

when a majority of the m strongest received signals of the first subset are associated with a same zone, considering that same zone to be a candidate zone;

adding a value k to the strongest received signal not in the first subset, which may or may not change the ranking of the received signals received at various strengths in the order of strength;

considering the m strongest received signals to be a second subset; and when a majority of the m strongest received signals of the second subset are associated with a same zone, determining whether that same zone matches the candidate zone, and if so, determining the portable transmitter to be located in the candidate zone.

10. The system of claim 8, wherein the processor is configured to allow external access and control.

11. The system of claim 8, wherein the access port further comprises a physical access port.

12. A method to locate a person in a multi-level building, comprising:

switching a WiFi communication system from a normal WiFi operating mode to an emergency WiFi tracking mode by use of an access port based on a signal indicating an emergency, wherein the WiFi communication system comprises a plurality of WiFi receivers located in the multi-level building;

transmitting a signal comprising an identification code for identifying the person by use of a portable transmitter coupled to the person;

receiving the signal by the plurality of WiFi receivers located in the multi-level building, substantially each WiFi receiver producing a received signal, wherein at least a first WiFi receiver is located on a first level and at least a second WiFi receiver is located on a second level, wherein the second level is different than the first level;

producing a signal strength estimation of the received signal received by the at least one WiFi receiver by use of a signal strength estimator coupled to the at least one WiFi receiver; and calculating a level of the multi-level building on which the person is located by use of a processor configured to receive the signal strength estimations and the identification code.

13. The method of claim 12, further comprising:

ranking the received signals received at various strengths in the order of strength;

considering the m strongest received signals to be a first subset, where m is a positive integer;

when a majority of the m strongest received signals of the first subset are associated with a same zone, considering that same zone to be a candidate zone;

adding a value k to the strongest received signal not in the first subset, which may or may not change the ranking of the received signals received at various strengths in the order of strength;

considering the m strongest received signals to be a second subset; and when a majority of the m strongest received signals of the second subset are associated with a same zone, determining whether that same zone matches the candidate zone, and if so, determining the portable transmitter to be located in the candidate zone.

14. The method of claim 12, wherein the portable transmitter is coupled to the clothing of the person.

15. The method of claim 12, wherein the processor is configured to allow external access and control.

16. The method of claim 12, wherein the access port comprises a physical access port.

17. The method of claim 12, wherein the portable transmitter comprises an emergency signal activator.

18. The method of claim 17, wherein the emergency signal activator comprises a voice recognition module.

19. The method of claim 17, wherein the emergency signal activator comprises an acoustic processing module to detect an audible emergency signal from another portable transmitter.

* * * * *